(12) United States Patent
Ahn et al.

(10) Patent No.: US 10,241,257 B2
(45) Date of Patent: Mar. 26, 2019

(54) DISPLAY APPARATUS

(71) Applicant: SAMSUNG ELECTRONICS CO., LTD., Suwon-si (KR)

(72) Inventors: Joon Seok Ahn, Suwon-si (KR); Kye Hoon Lee, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/847,140

(22) Filed: Dec. 19, 2017

(65) Prior Publication Data
US 2018/0172900 A1    Jun. 21, 2018

(30) Foreign Application Priority Data

Dec. 19, 2016    (KR) .................... 10-2016-0173744

(51) Int. Cl.
*F21V 7/04*    (2006.01)
*F21V 8/00*    (2006.01)

(52) U.S. Cl.
CPC ......... *G02B 6/0085* (2013.01); *G02B 6/0026* (2013.01); *G02B 6/0068* (2013.01); *G02B 6/009* (2013.01); *G02B 6/0031* (2013.01); *G02B 6/0055* (2013.01); *G02B 6/0088* (2013.01)

(58) Field of Classification Search
CPC ... G02B 6/0038; G02B 6/0053; G02B 6/0036
USPC ........................................................ 362/606
See application file for complete search history.

(56) References Cited

U.S. PATENT DOCUMENTS

| | | | |
|---|---|---|---|
| 9,772,441 B2 * | 9/2017 | Abe | G02B 6/0088 |
| 10,007,054 B2 * | 6/2018 | Kim | G02B 6/009 |
| 2011/0310331 A1 | 12/2011 | Heo et al. | |
| 2013/0050612 A1 * | 2/2013 | Hur | G02F 1/133603 349/62 |
| 2013/0329161 A1 | 12/2013 | Park et al. | |

(Continued)

FOREIGN PATENT DOCUMENTS

| | | |
|---|---|---|
| EP | 2 734 894 B1 | 5/2016 |
| JP | 2006-331969 A | 12/2006 |
| JP | 2007-42552 A | 2/2007 |

(Continued)

OTHER PUBLICATIONS

International Search Report (PCT/ISA/210) dated Feb. 19, 2018 issued by the International Searching Authority in International Application No. PCT/KR2017/012604.

*Primary Examiner* — Ahshik Kim
(74) *Attorney, Agent, or Firm* — Sughrue Mion, PLLC

(57) ABSTRACT

A display apparatus includes: a display panel; a light guide plate disposed behind the display panel; a printed circuit board; a heat radiator disposed on the printed circuit board and configured to radiate heat; and a plurality of light source packages disposed on the printed circuit board and configured to supply light to the light guide plate, each light source package of the plurality of light source packages including: a light source configured to generate the light; a light converter configured to convert properties of the light generated by the light source, and a package housing in which the light source is installed, the package housing being disposed on the printed circuit board and in contact with the light converter to transfer heat from the light converter to the heat radiator.

20 Claims, 10 Drawing Sheets

(56) References Cited

U.S. PATENT DOCUMENTS

2015/0270455 A1    9/2015  Naasani et al.
2018/0114780 A1*   4/2018  Sung .................. H01L 33/60

FOREIGN PATENT DOCUMENTS

| KR | 10-2012-0045940 A | 5/2012 |
| KR | 10-2012-0092888 A | 8/2012 |
| KR | 10-2013-0046311 A | 5/2013 |

* cited by examiner

DISPLAY APPARATUS

CROSS-REFERENCE TO RELATED APPLICATION

This application claims priority from Korean Patent Application No. 10-2016-0173744, filed on Dec. 19, 2016 in the Korean Intellectual Property Office, the disclosure of which is incorporated herein by reference.

BACKGROUND

1. Field

Example embodiments of the present disclosure relate to a display apparatus, and more particularly, to a display apparatus of improving heat radiation efficiency.

2. Description of the Related Art

In general, a display apparatus is an apparatus which displays a screen, and includes a monitor or a television set. A display apparatus may utilize a self-luminous display panel such as an organic light emitting diode (OLED) panel, or a light-receiving and emitting display panel such as a liquid crystal display (LCD) panel.

A display apparatus which utilizes the light-receiving and emitting display panel may include an LCD panel on which a screen is displayed, and a backlight unit to supply light to the LCD panel. The backlight unit includes a light source module having light sources, a light guide plate to receive light from the light sources and to emit light to the LCD panel, and a plurality of optical sheets through which light passed the light guide plate passes. The optical sheets may include a reflective sheet, a light guide plate, a diffusion sheet, a prism sheet, a polarizing sheet, and the like.

The backlight unit includes a light converter to convert properties of light generated by the light sources. However, since the light converter and the light sources may generate a large amount of heat, light efficiency deteriorates, which may lead to malfunction or damage of the light source module.

SUMMARY

One or more example embodiments provide a display apparatus having a structure of radiating heat generated by a light source package.

One or more example embodiments also provide a display apparatus having a structure of radiating heat generated by a light source and a light converter.

One or more example embodiments provide a display apparatus of improving color reproducibility.

According to an aspect of an example embodiment, there is provided a display apparatus including: a display panel; a light guide plate disposed behind the display panel; a printed circuit board; a heat radiator disposed on the printed circuit board and configured to radiate heat; and a plurality of light source packages disposed on the printed circuit board and configured to supply light to the light guide plate, each light source package of the plurality of light source packages including: a light source configured to generate the light; a light converter configured to convert properties of the light generated by the light source, and a package housing in which the light source is installed, the package housing being disposed on the printed circuit board and in contact with the light converter to transfer heat from the light converter to the heat radiator.

The heat radiator may be in contact with the package housing of each of the plurality of light source packages.

The heat radiator may include: a radiating member disposed on the printed circuit board; and an expansion member disposed between and in contact with the radiating member and the package housing of each of the plurality of light source packages to expand heat transfer areas between the radiating member and the package housing of each of the plurality of light source packages.

The radiating member may include a first heat transfer surface facing the package housing and a third heat transfer surface including the first heat transfer surface, the package housing of each of the plurality of light source packages may include a second heat transfer surface facing the radiating member and a fourth heat transfer surface including the second heat transfer surface, and the expansion member may be in contact with the radiating member through the third heat transfer surface, and in contact with the package housing through the fourth heat transfer surface.

The third heat transfer surface and the fourth heat transfer surface may be larger than the first heat transfer surface and the second heat transfer surface, respectively.

The radiating member may include a first heat transfer surface and a third heat transfer surface extending from the first heat transfer surface, the package housing may include a second heat transfer surface and a fourth heat transfer surface extending from the fourth heat transfer surface, the first heat transfer surface of the radiating member may be in contact with the fourth heat transfer surface of the package housing, and the expansion member may be in contact with the third heat transfer surface of the radiating member, and in contact with the second heat transfer surface of the package housing.

The expansion member may cover at least a part of one surface of the radiating member.

The printed circuit board may include: a first printed circuit board disposed on a rear surface of the light guide plate; and a second printed circuit board extended from the first printed circuit board and facing a side surface of the light guide plate, wherein the plurality of light source packages are arranged on the second printed circuit board, the radiating member is disposed on the first printed circuit board, and the expansion member is disposed adjacent to a bent portion between the first printed circuit board and the second printed circuit board.

The expansion member may include silicon.

The heat radiator may be integrated into the package housing, and extends from the package housing along the mounting surface.

The heat radiator may include: a radiating member in contact with a surface of each of the plurality of light source packages; and an extension radiating member extending from the radiating member, and configured to be in contact with a side surface each of the plurality of light source packages.

The extension radiating member may be disposed between space between the plurality of light source packages.

The heat radiator may include: a radiating member in contact with first surfaces of the plurality of light source packages; and an extension radiating member extending from the radiating member, and surrounding other surfaces of the plurality of light source packages, and side surfaces of the plurality of light source packages connecting the first surfaces to the other surfaces.

The extension radiating member may include a member reflecting layer facing the light guide plate, and configured to reflect light reflected by the light guide plate toward the light guide plate.

The heat radiator may be spaced from a light path from the plurality of light source packages toward the light guide plate.

The display apparatus may further include a reflective member disposed on a rear surface of the light guide plate, and configured to reflect light emitted from the plurality of light source packages toward the display panel, wherein the heat radiator is disposed between the reflective member and the printed circuit board.

According to an aspect of another example embodiment, there is provided a display apparatus including: a display panel; a light guide plate disposed behind the display panel; a first printed circuit board; a second printed circuit board extending from the first printed circuit board; and a plurality of light source packages arranged on the first printed circuit board, and configured to supply light to the light guide plate, each of the plurality of light source packages including: a package housing having an open portion opening toward the light guide plate; a light source disposed in the package housing, and configured to generate the light; and a light converter configured to convert properties of the light generated by the light source, and having a first side facing the light source, and a second side opposite to the first side and facing the light guide plate, wherein a portion of the light converter is in contact with the package housing along an inner surface of the package housing; and a heat radiator disposed on the second printed circuit board, and configured to receive heat transferred from the package housing of each of the plurality of light source packages and radiate the heat.

The heat radiator may include: a radiating member; and an expansion member disposed between and in contact with the radiating member and the package housing of each of the plurality of light source packages to expand heat transfer areas between the radiating member and the package housing of each of the plurality of light source packages.

The radiating member may be disposed on the second printed circuit board, and the expansion member may be disposed adjacent to a bent portion between the first printed circuit board and the second printed circuit board.

According to an aspect of another example embodiment, there is provided a display apparatus including: a display panel; a printed circuit board; a plurality of light sources mounted on the printed circuit board, and configured to generate light; a light guide plate configured to receive the light generated by the plurality of light sources and transfer the light to the display panel; a light converter disposed between the plurality of light sources and the light guide plate, and configured to convert properties of the light generated by the plurality of light sources; a package housing in which the plurality of light sources are arranged, and the light converter is installed; and a heat radiator integrated into the package housing, and extending from the package housing along the printed circuit board, the heat radiator being configured to radiate heat transferred from the package housing.

BRIEF DESCRIPTION OF THE DRAWINGS

The above and/or other aspects of will become apparent and more readily appreciated from the following description of example embodiments, taken in conjunction with the accompanying drawings of which.

DETAILED DESCRIPTION

Figure 1:
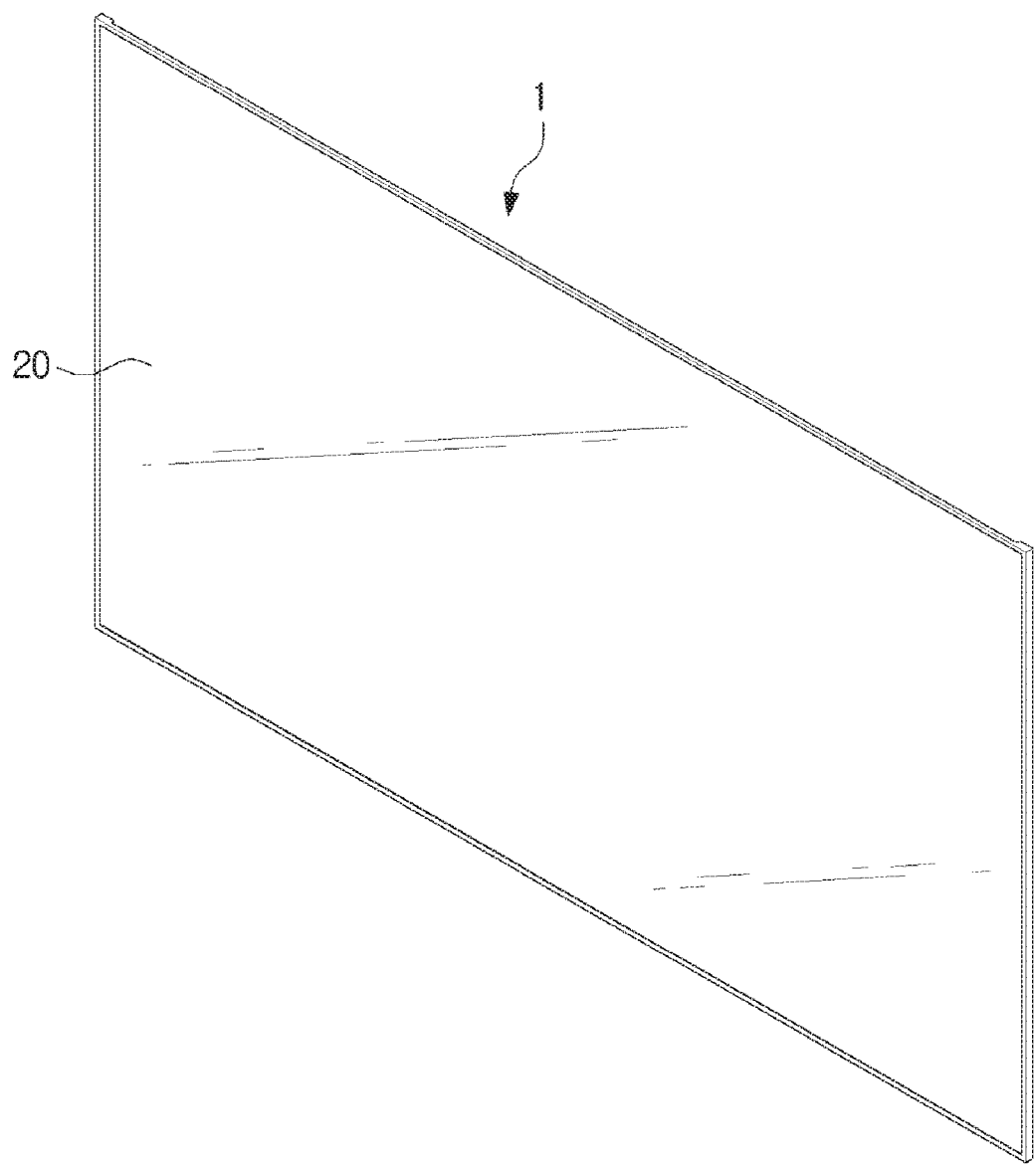
FIG. 1 is a perspective view of a display apparatus according to an example embodiment.

Configurations illustrated in the embodiments and the drawings described in the present specification are only examples, and thus it is to be understood that various modified examples.

Also, like reference numerals or symbols provided in the drawings of the present specification represent members or components that perform the substantially same functions.

The terms used in the present specification are used to describe the example embodiments. Accordingly, it should be apparent to those skilled in the art that the following description of example embodiments is provided for illustration purpose only and not for the purpose of limiting the inventive concept as defined by the appended claims and their equivalents. It is to be understood that the singular forms "a," "an," and "the" include plural referents unless the context clearly dictates otherwise. It will be understood that when the terms "includes," "comprises," "including," and/or "comprising," when used in this specification, specify the presence of stated features, figures, operations, components, or combination thereof, but do not preclude the presence or addition of one or more other features, figures, steps, components, members, or combinations thereof.

Also, it will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present disclosure. As used herein, the term "and/or" includes any and all combinations of one or more of associated listed items.

Hereinafter, the example embodiments will be described in detail with reference to the accompanying drawings.

Figure 2:
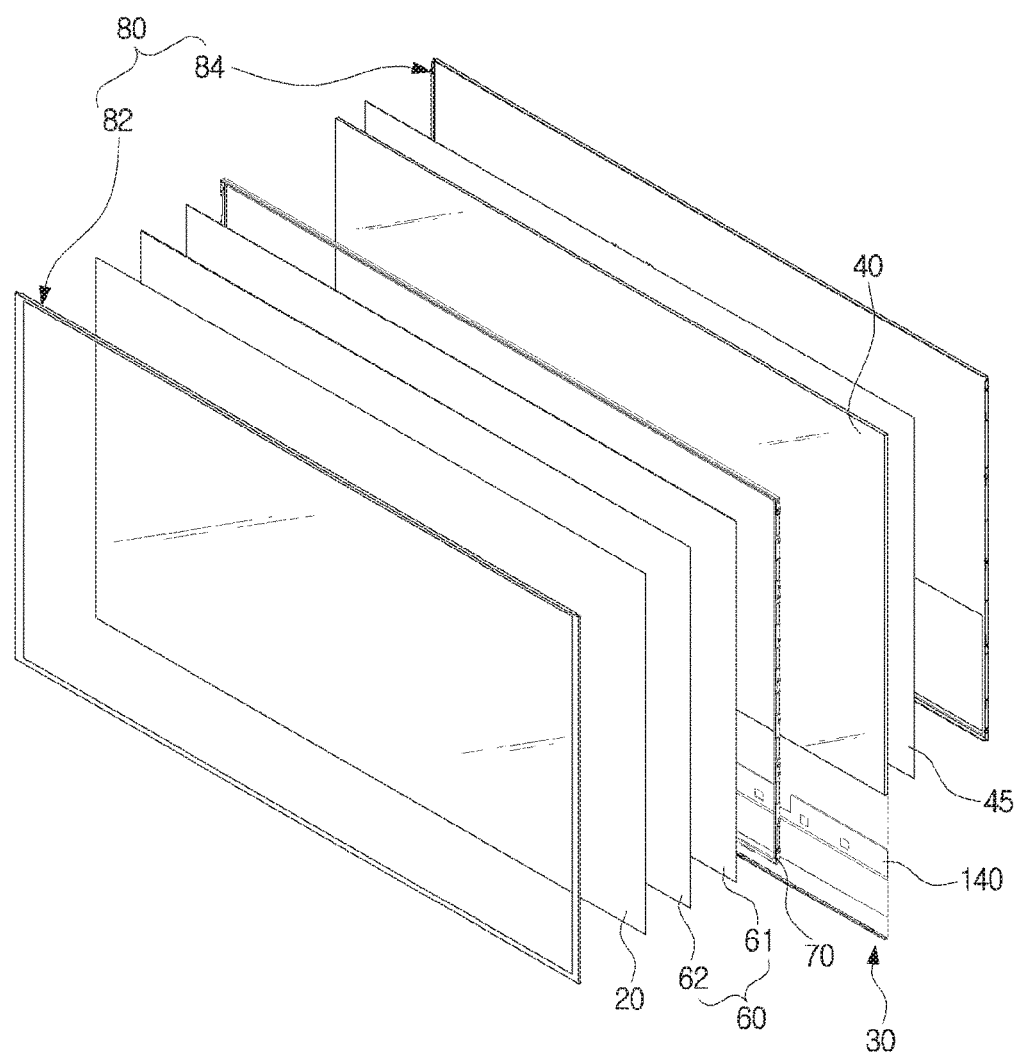
FIG. 2 is an exploded perspective view of a display apparatus according to an example embodiment.
Figure 3:
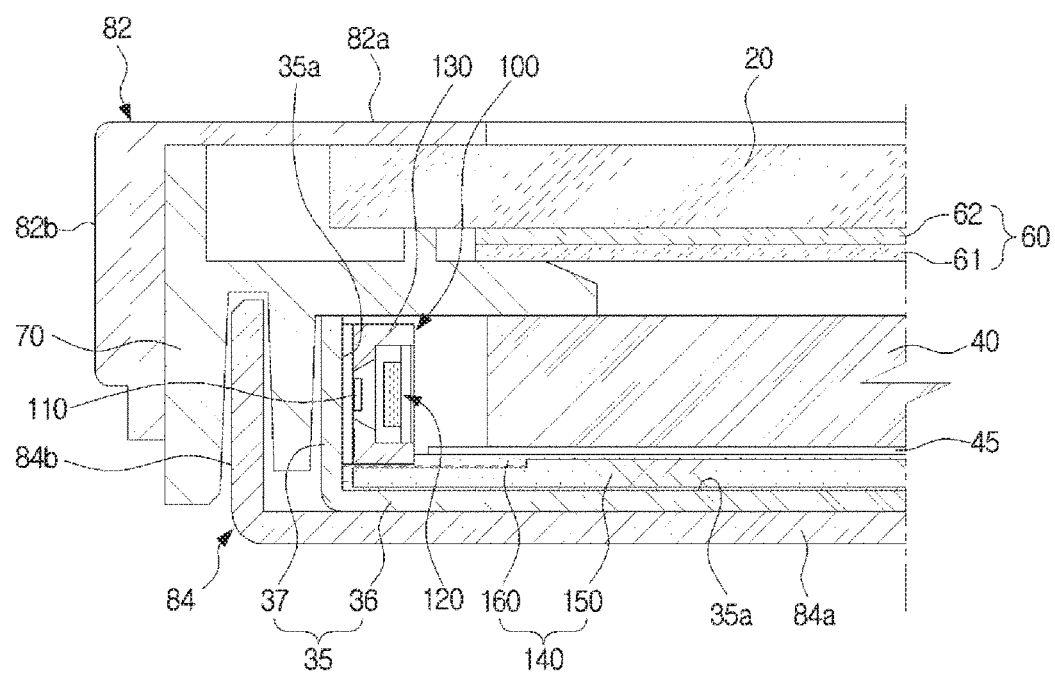
FIG. 3 is a cross-sectional view of a portion of a display apparatus according to an example embodiment.

FIG. 1 is a perspective view of a display apparatus according to an example embodiment, FIG. 2 is an exploded perspective view of a display apparatus according to an example embodiment, and FIG. 3 is a cross-sectional view of a portion of a display apparatus according to an example embodiment.

For convenience of description, a display apparatus 1 shown in FIGS. 1, 2 and 3 is assumed to be a flat panel display apparatus, however the display apparatus 1 may be a curved display apparatus or a bendable display apparatus.

The display apparatus 1 may include a display module to display an image.

The display module may include a display panel 20 on which an image is displayed, and a backlight unit to supply light to the display panel 20. The backlight unit may include a light source module 30 and an optical sheet 60. More specifically, the backlight unit may include the light source module 30 disposed behind the display panel 20, a light guide plate 40 disposed in space between the display panel 20 and the light source module 30 to diffuse light generated by the light source module 30 and transfer the diffused light to the display panel 20, the optical sheet 60 disposed between the display panel 20 and the light guide plate 40 to convert optical properties of light, a middle mold 70 supporting the display panel 20 and the light guide plate 40, and a display chassis 80 forming an outer appearance of the display apparatus 1. The display chassis 80 may include a top chassis 82 coupled to a front portion of the middle mold 70 and supporting the display panel 20 installed in the middle mold 70, and a bottom chassis 84 coupled to a rear portion of the middle mold 70, wherein the light source module 30 is disposed at both inner edges of the bottom chassis 84.

The light source module 30 may be disposed in the inside of the bottom chassis 84 to radiate light toward the light guide plate 40. In the current example embodiment, the light source module 30 may be disposed in a lower portion of the display module, although embodiments are not limited thereto. According to other example embodiments, the light source module 30 may be disposed in at least a portion among a lower portion, a side portion, and an upper portion of the display module, or the light source module 30 may be disposed along all the edges of the display module. Light sources of the light source module 30 may be arranged in the edge-type display manner or in a direct-type display manner.

The light guide plate 40, the display panel 20, and the top chassis 82 may be disposed in the middle mold 70 in this order in the front direction, and the bottom chassis 84 may be disposed behind the middle mold 70. The middle mold 70 may support the above-described components, and separate the display panel 20 and the bottom chassis 84 from each other.

As shown in FIG. 3, the top chassis 82 may include a bezel portion 82a to cover front edges of the display panel 20, and a top side portion 82b extending rearward from the outer ends of the bezel portion 82a to cover the side surfaces of the middle mold 70.

The bottom chassis 84 may include a rear portion 84a forming a rear portion of the display module, and a bottom side portion 84b extending forward from edges of the rear portion 84a and coupled into the middle mold 70.

Figure 4:
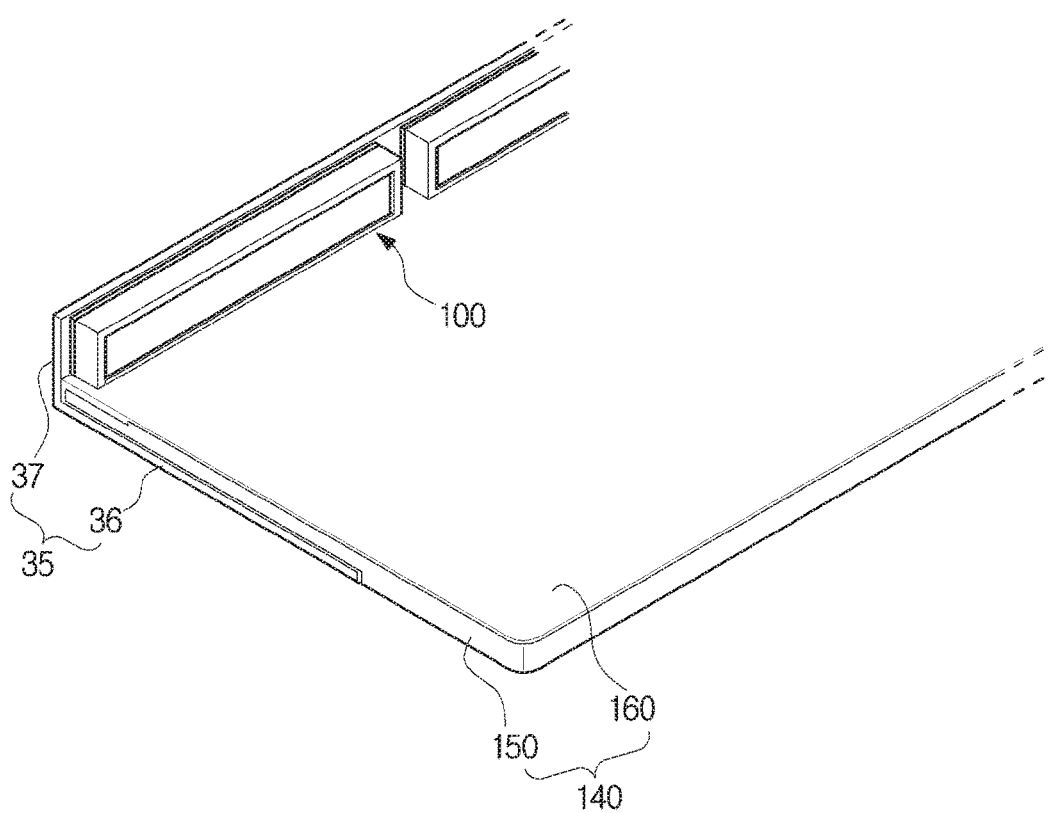
FIG. 4 is a perspective view of a light source module of a display apparatus according to an example embodiment.

FIG. 4 is a perspective view of a light source module of a display apparatus according to an example embodiment. The light source module 30 may include a light source package 100 and a printed circuit board (PCB) 35.

Figure 5:
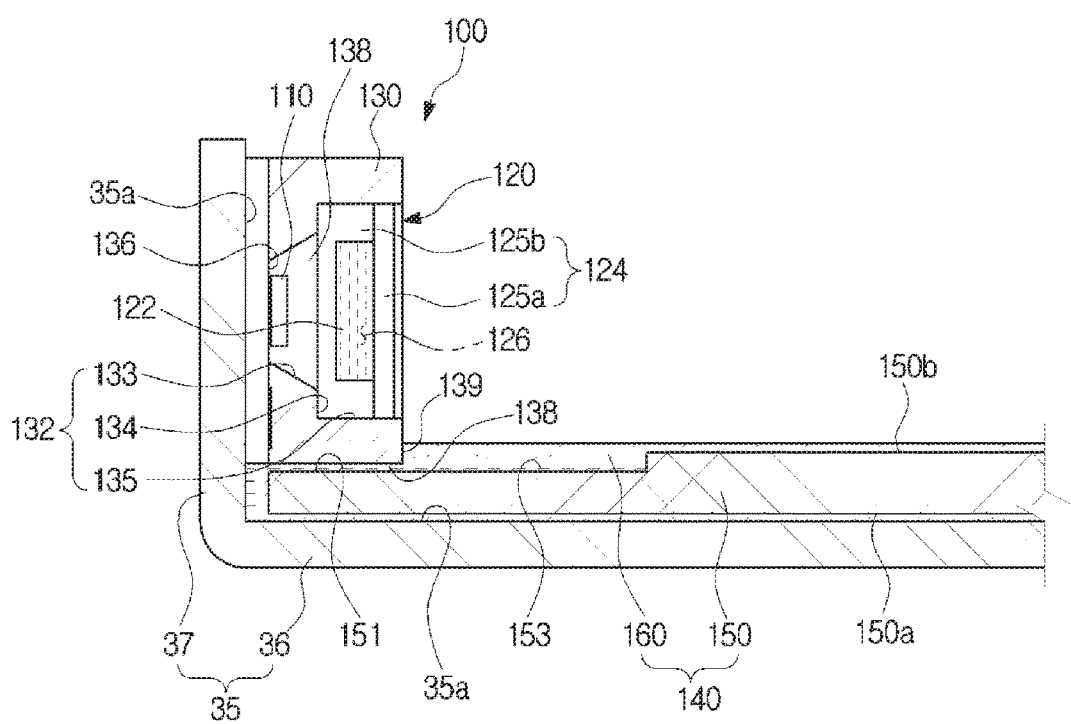
FIG. 5, 6 are a cross-sectional view of a light source module of a display apparatus according to an example embodiment.

FIG. 5 is a cross-sectional view of a light source module of a display apparatus according to an example embodiment The light source package 100 may include a light source 110 and a light converter 120. The light source 110 may be a light emitting diode (LED). Also, a plurality of light sources 110 may be provided, and the plurality of light sources 110 may be arranged at regular intervals. Also, a plurality of light source packages 100 may be arranged with intervals on the PCB 35. The LED may be a blue LED. The light converter 120 will be described later.

The light guide plate 40 may be spaced apart from the bottom chassis 84 so that the light sources 110 are disposed on the bottom side portion 84b, that is, in both sides of space between the light guide plate 40 and the inner surface of the bottom chassis 84.

The light guide plate 40 may include a reflective member 45 on the rear surface. The reflective member 45 may be provided on the rear surface of the light guide plate 40 such that all light emitted from the light sources 110 is directed to the front surface of the light guide plate 40. The reflective member 45, which is a reflective plate, may be formed as a separate member from the light guide plate 40 and then disposed on the rear surface of the light guide plate 40, or the reflective member 45 may be integrated into the light guide plate 40. The reflective member 45 may also be formed by a reflective coating on the rear surface of the light guide plate 40.

The light guide plate 40 may guide and transmit light generated by the light sources 110. For this, the light guide plate 40 may be formed of a transparent resin material. The light guide plate 40 may be spaced a predetermined distance apart from the light sources 110 in order to minimize deformation due to heat generated in the light sources 110.

The plurality of light source packages 100 may be arranged with intervals on the PCB 35. Each light source package 100 may include the light source 110 and the light converter 120. The light converter 120 may be disposed between the light source 110 and the light guide plate 40 to change a wavelength of light radiated from the light source 110 to the light guide plate 40.

The light converter 120 may convert properties of light generated by the light source 110 to be transferred toward the light guide plate 40. More specifically, the light converter 120 may convert a wavelength of the light. One surface of the light converter 120 may face the light source 110, and the other surface of the light converter 120 may face the light guide plate 40.

As shown in FIG. 5, the light converter 120 may include a quantum dot (QD) 122 and a unit body 124 surrounding the quantum dot 122. The unit body 124 may form receiving space 126 therein, and the quantum dot 122 may be disposed in the receiving space 126. The receiving space 126 of the unit body 124 may be hermetically closed, and the quantum dot 122 may be disposed in the hermetically closed receiving space 126. Therefore, the quantum dot 122 may not be exposed to an external environment to thereby prevent oxidation and deformation due to moisture.

The unit body 124 may be formed of a light transmissive material for transmission of light.

The unit body 124 may include a first body 125a, and a second body 125b which is in contact with the first body 125a and has a concave or recessed surface facing the first body 125a to form the receiving space 126. That is, the unit body 124 may be configured to seal the quantum dot 122 therein. The first and second bodies 125a and 125b may be in close contact with or coupled to each other so that the quantum dot 122 is not influenced from the outside. The receiving space 126 may be formed by a unit inner wall formed to be concave in the second body 125b.

In the current example embodiment, the surface of the second body 125b may be formed in a concave or recessed shape, and the first body 125a may be in close contact with or coupled with the second body 125b to form the receiving space 126, although embodiments are not limited thereto.

According to another example embodiment, both the facing surfaces of the first and second bodies 125a and 125b may be concave surfaces, and the first body 125a may be in close contact with or coupled with the second body 125b to form the receiving space 126. Or, the first body 125a may have a concave surface facing the second body 125b, and may be in close contact with or coupled with the second body 125b to form the receiving space 126.

Quantum dots will be described as follows. If electrons that have been in a valence band receive energy, they are excited to a conduction band. Thereafter, the electrons again lose their energy to fall to the valance band, and at this time, the energy is emitted as light. The quantum dots generate strong fluorescence in a narrow wavelength band, and can generate all colors of visible light according to their sizes. Also, since the quantum dots can themselves generate natural colors, the quantum dots show high color reproduction without color loss. The quantum dots generate light of a shorter wavelength at smaller particles, and light of a longer wavelength at larger particles. The quantum dots may be a compound, such as cadmium selenide (CdSe), cadmium sulfide (CdS), cadmium telluride (CdTe), zinc selenide (ZnSe), zinc telluride (ZnTe), and zinc sulfide (ZnS).

The light source package 100 may include a package housing 130. The light source 110 and the light converter 120 may be disposed inside the package housing 130. The package housing 130 may be configured to absorb heat generated by the light source 110 and the light converter 120. In order to absorb heat generated by the light source 110 and the light converter 120, the package housing 130 may be in contact with the light converter 120. Also, the package housing 120 may be formed of a material having a high heat transfer rate. One portion of the package housing 130 may open toward the light guide plate 40.

The light source 110 may be disposed in the inside of the package housing 130. The package housing 130 may be mounted on the PCB 35. The package housing 130 may be disposed around the light source 110 to reflect light generated by the light source 110 to the light converter 120. That is, a reflecting layer 132 may be provided on the inner surface of the package housing 130 to reflect light. The reflecting layer 132 may be provided to reflect light on a light path of the light source 110.

The reflecting layer 132 may include a reflecting cup portion 133 to receive the light source 110. The reflecting cup portion 133 may be inclined at an angle of reflection to reflect light and may have a concave shape. The reflection angle of the reflecting cup portion 133 is not limited as long as light reflected by the reflecting cup portion 133 can be directed to the light converter 120. A transmissive sealing material 138 may be filled between the reflecting cup portion 133 and the light converter 120. The reflecting cup portion 133 may be formed on the inner surface of the package housing 130, and may include a bottom surface 136 on which the light source 110 is disposed.

The reflecting layer 132 may include a resting surface 134 extending from the reflecting cup portion 133 and facing the light guide plate 40. One surface of the light converter 120 may be disposed on the resting surface 134. That is, one surface of the light converter 120 may be disposed on the resting surface 134 to face the light source 110.

The reflecting layer 132 may include a unit supporting surface 135. The unit supporting surface 135 may face a side surface of the light converter 120 connecting one surface of the light converter 120 to the opposite surface of the light converter 120. The unit supporting surface 135 may support the side surface of the light converter 10.

The light source module 30 may include a heat radiator 140.

The heat radiator 140 may radiate heat generated by the plurality of light source packages 100. More specifically, heat generated by the light source 110 and the light converter 120 may be transferred to the package housing 130, and the heat may be transferred from the package housing 130 to the heat radiator 140 which radiates the heat transferred from the package housing 130.

The heat radiator 140 may be disposed on a mounting surface 35a of the PCB 35. The PCB 35 may include a first PCB 36 disposed on a rear surface of the light guide plate 40, and a second PCB 37 extending from the first PCB 36 and facing a side surface of the light guide plate 40. The light source packages 100 may be mounted on the second PCB 37, and the heat radiator 140 may be disposed on the first PCB 36. Since the heat radiator 140 is located on the mounting surface 35a of the PCB 35 together with the light source packages 100, the heat radiator 140 can efficiently radiate heat generated by and transferred from the light source packages 100. The heat radiator 140 may cover at least a part of the mounting surface 35a of the first PCB 36.

The heat radiator 140 may be in contact with a portion of the package housing 130 for heat radiation from the package housing 130. In the current example embodiment, since the plurality of light source packages 100 are mounted on the PCB 35, the plurality of light source packages 100 may be aligned in a longitudinal direction of the heat radiator 140 such that one portions of all of the package housings 130 of the plurality of light source packages 100 are in contact with the heat radiator 140.

The heat radiator 140 may be spaced from a path of light passing through the light converter 120 and transferred toward the light guide plate 40. Since the heat radiator 140 is spaced apart from the light path, it is possible to prevent additional radiant heat due to light generated by the light source packages 100. More specifically, the heat radiator 140 may be disposed between the reflective member 45 and the PCB 35 to prevent additional heat transfer due to radiant heat.

The heat radiator 140 may include a radiating member 150 and an expansion member 160.

The radiating member 150 may have the shape of a panel. Also, the radiating member 150 may be made of a material capable of easily transferring heat in order to facilitate radiation. The radiating member 150 may have a large surface area rather than a large thickness to easily transfer heat from the package housings 130. The radiating member 150 may be formed of the same material as the package housings 130 or a different material.

The radiating member 150 may be disposed on the first PCB 36, and the expansion member 160 may be disposed adjacent to the bent portion between the first and second PCBs 36 and 37. The expansion member 160 may be configured to connect the radiating member 150 to the package housing 130 and to expand a heat transfer area.

The expansion member 160 may be in contact with the radiating member 150 and the package housings 130 to expand or widen the heat transfer area of the radiating member 150 and the package housing 130. One surface of the expansion member 160 may be in contact with the package housing 130, and another surface of the expansion member 160 may be in contact with the radiating member 150. The expansion member 160 may be disposed between the package housing 130 and the radiating member 150 to transfer heat from the package housing 130 to the radiating member 150. The expansion member 160 may be injected in a liquid state between the package housing 130 and the radiating member 150 and then solidified. By the medium of the expansion member 160, adherence can be improved compared to the case in which the package housing 130 is in direct contact with the radiating member 150. The expansion member 160 may be formed of silicon or another material.

The expansion member 160 may cover at least a part of the radiating member 150. If a surface of the radiating member 150 facing the PCB 35 is referred to as a first surface 150a and a surface of the radiating member 150 opposite to the first surface 150a is referred to as a second surface 150b, the expansion member 160 may cover at least a part of the first and second surfaces 150a and 150b. As shown in FIG. 5, the expansion member 160 may cover both of the first and second surfaces 150a and 150b.

Referring to FIG. 5, the radiating member 150 may include a first heat transfer surface 151 facing the package housing 130 and a third heat transfer surface 153 including the first heat transfer surface 151, and the package housing 130 may include a second heat transfer surface 137 facing the radiating member 150 and a fourth heat transfer surface 139 including the second heat transfer surface 137. The expansion member 160 may be in contact with the radiating member 150 through the third heat transfer surface 153, and in contact with the package housing 130 through the fourth heat transfer surface 139. The third and fourth heat transfer surfaces 153 and 139 may be larger than the first and second heat transfer surfaces 151 and 137. That is, the expansion member 160 may be in contact with the radiating member 150 and the package housing 130 to form a larger heat transfer area than that formed when the radiating member 150 is in direct contact with the package housing 130.

The radiating member 150 may be spaced a predetermined distance apart from the package housing 130 so that the expansion member 160 is disposed in the space between the radiating member 150 and the package housing 130, as shown in FIG. 5. However, the radiating member 150 may be in contact with the package housing 130, and the expansion member 160 may be disposed around an area where the radiating member 150 contacts the package housing 130, as shown in FIG. 6.

Figure 6:
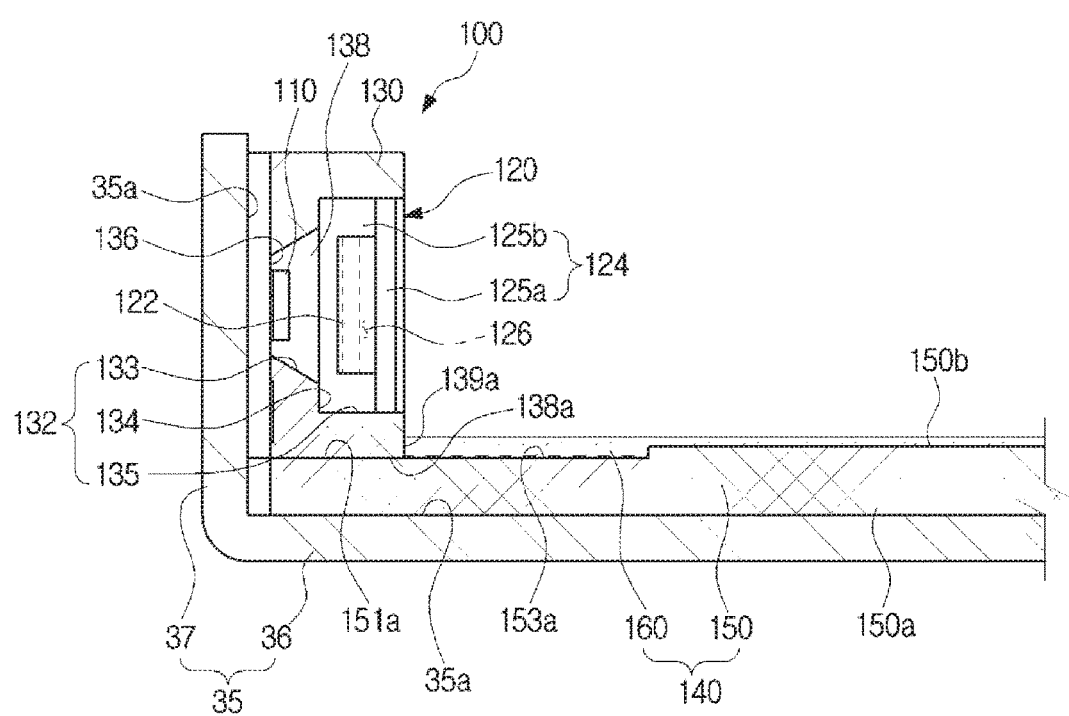

More specifically, as shown in FIG. 6, the radiating member 150 and the package housing 130 may contact each other through a first heat transfer surface 151a and a fourth heat transfer surface 139a, and the expansion member 160 may contact the radiating member 150 through a third heat transfer surface 153a extending from the first heat transfer surface 151a, and contact the package housing 130 through a second heat transfer surface 137a extending from the fourth heat transfer surface 139a.

Hereinafter, a display apparatus according to another example embodiment will be described. Hereinafter, repeated descriptions about the same configurations as those described above will be omitted.

Figure 7:
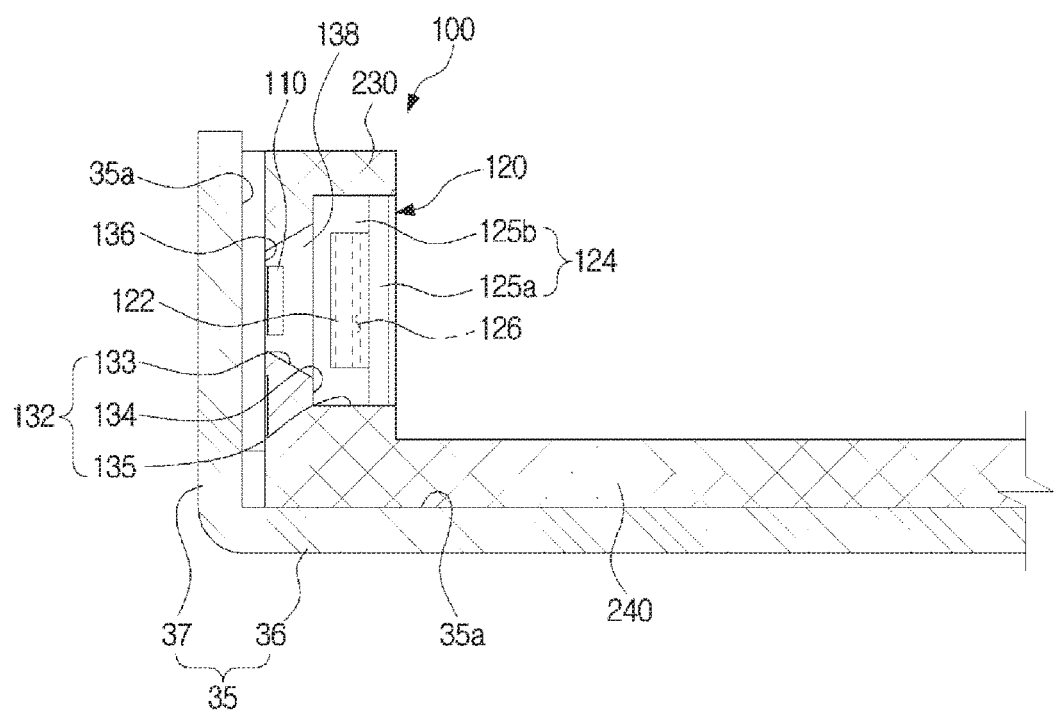
FIG. 7 is a cross-sectional view of a light source module of a display apparatus according to another example embodiment.

FIG. 7 is a cross-sectional view of a light source module of a display apparatus according to another example embodiment.

A heat radiator 240 may extend from a package housing 230. That is, the heat radiator 240 may be integrated into the package housing 230. Since the heat radiator 240 is integrated into the package housing 230, heat transferred to the package housing 230 may be radiated to the heat radiator 240. The heat radiator 240 may extend from the package housing 230 along the mounting surface 35a.

Hereinafter, a display apparatus according to another example embodiment will be described. Hereinafter, repeated descriptions about the same configurations as those described above will be omitted.

Figure 8:
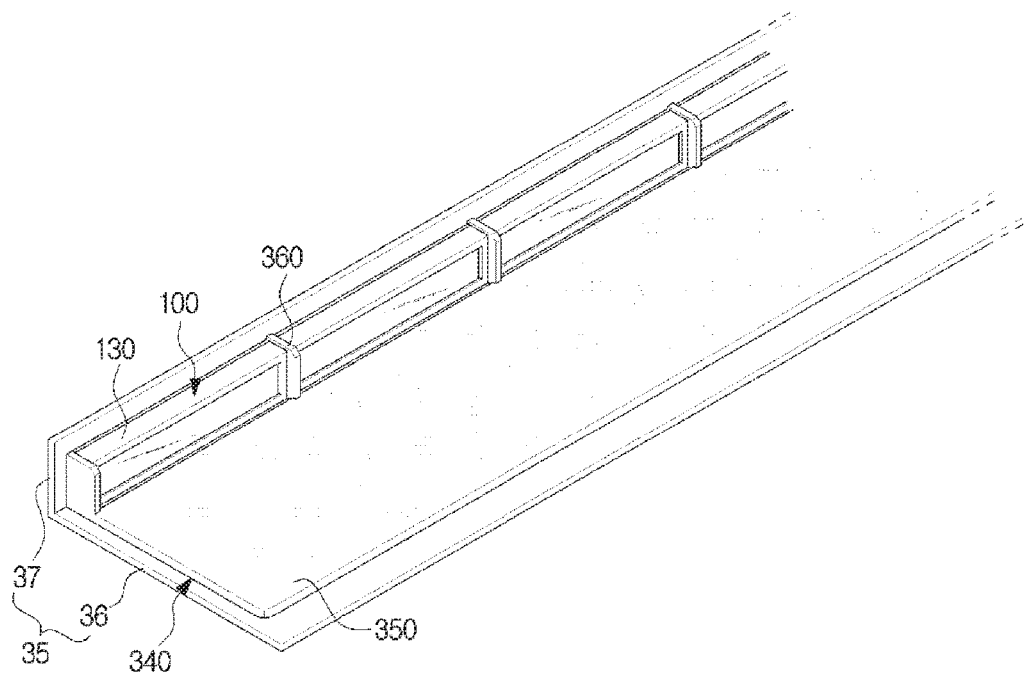
FIG. 8 is a perspective view of a light source module of a display apparatus according to another example embodiment.

FIG. 8 is a perspective view of a light source module of a display apparatus according to another example embodiment.

A heat radiator 340 may include a radiating member 350 and an extension radiating member 360.

The radiating member 350 may be in the shape of a panel. Also, the radiating member 350 may be formed of a material capable of easily transferring heat in order to facilitate radiation. The radiating member 350 may have a large surface area rather than a large thickness to easily transfer heat from the package housing 130. The radiating member 350 may be in contact with one surfaces of the plurality of light source packages 100. That is, the radiating member 350 may be in contact with one surfaces of the package housings 130 to transfer heat.

The extension radiating member 360 may extend from the radiating member 350 to be in contact with side surfaces of adjacent light source packages 100 of the plurality of light source packages 100. The plurality of light source packages 100 may be in contact with the heat radiator 340 at the one surfaces and side surfaces to transfer heat to the heat radiator 340, thereby expanding a heat transfer area for transferring heat to the heat radiator 340.

Also, the extension radiating member 360 may fill space between adjacent light source packages 100 of the plurality of light source packages 100. That is, the extension radiating member 360 may cover at least a part of the second PCB 37. Through the configuration, by widening the area of the heat radiator 340, it is possible to improve a heat transfer rate, and to prevent radiant heat from being transferring to the PCB 35, thereby preventing a malfunction that may occur due to overheat.

Hereinafter, a display apparatus according to another example embodiment will be described. Hereinafter, repeated descriptions about the same configurations as those described above will be omitted.

Figure 9:
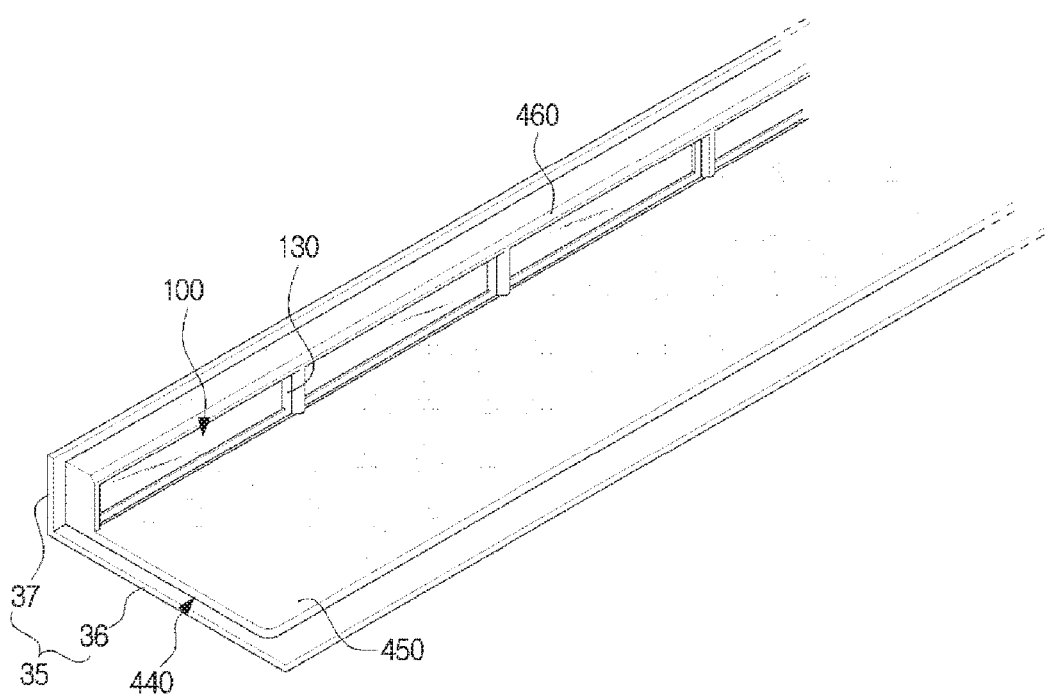
FIG. 9 is a perspective view of a light source module of a display apparatus according to another example embodiment.

FIG. 9 is a perspective view of a light source module of a display apparatus according to another example embodiment.

A heat radiator 440 may include a radiating member 450 and an extension radiating member 460.

The radiating member 450 may be in the shape of a panel. Also, the radiating member 450 may be formed of a material capable of easily transferring heat in order to facilitate radiation. The radiating member 450 may have a large surface area rather than a large thickness to easily transfer heat from the package housing 130. The radiating member 450 may be in contact with first surfaces of the plurality of light source packages 100 to transfer heat.

The extension radiating member 460 may extend from the radiating member 450 to be in contact with second surfaces of the plurality of light source packages 100, which are opposite to the first surfaces of the plurality of light source packages 100, and in contact with side surfaces of the plurality of light source packages 100, which are located between the first surfaces of the plurality of light source packages 100 and the second surfaces of the plurality of light source packages 100. The plurality of light source packages 100 may transfer heat to the heat radiator 440 at the side surfaces and the second surfaces, thereby expanding a heat transfer area for transferring heat to the heat radiator 440.

Also, the extension radiating member 460 may fill space between the plurality of light source packages 100. That is, the extension radiating member 460 may cover at least a part of the second PCB 37. Through the configuration, it is possible to widen the area of the heat radiator 440, and to prevent radiant heat from being transferred to the PCB 35, thereby preventing a malfunction that may occur due to overheat.

Hereinafter, a display apparatus according to another example embodiment will be described. Hereinafter, repeated descriptions about the same configurations as those described above will be omitted.

Figure 10:
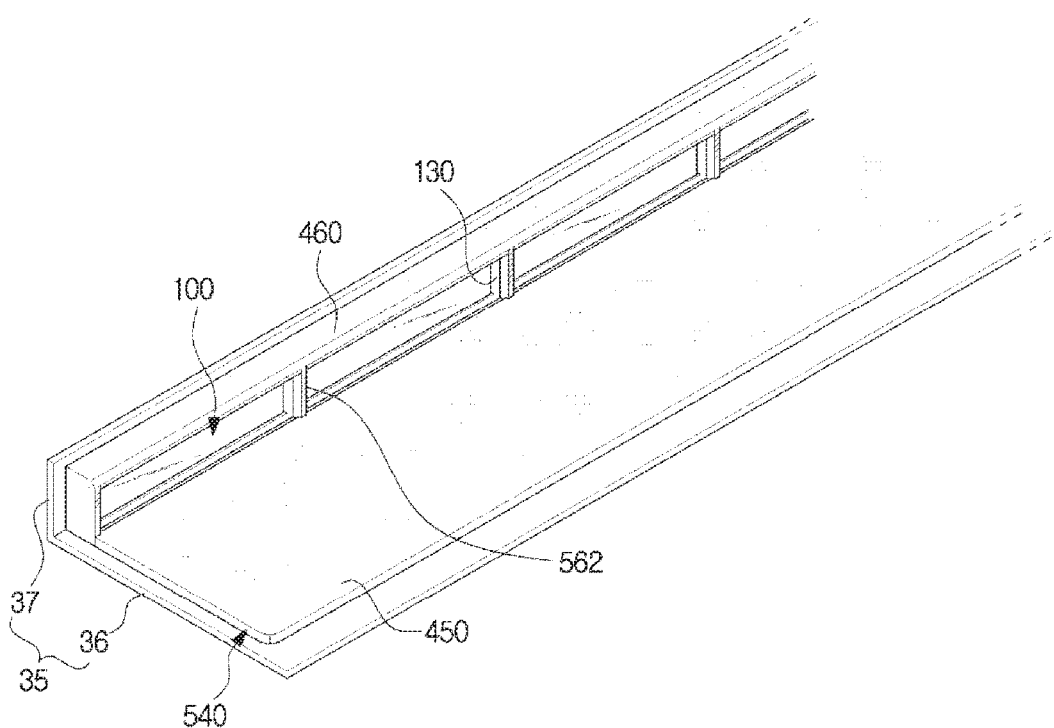
FIG. 10 is a perspective view of a light source module of a display apparatus according to another example embodiment.

FIG. 10 is a perspective view of a light source module of a display apparatus according to another example embodiment.

A heat radiator 540 may include a member reflecting layer 562.

The member reflecting layer 562 may be formed on a surface of the extension radiating member 460 of FIG. 9 to reflect light. For convenience of description, the member reflecting layer 562 is shown to be added to the display apparatus of FIG. 9, however, the member reflecting layer 562 may be applied to any of the display apparatuses according to the above-described example embodiments. Light generated by the light source packages 100 may be incident to the light guide plate 40, and a part of the light may be reflected toward the light source packages 100 from the side surface of the light guide plate 40. In order to cause the reflected light to be again incident to the light guide plate 40, the member reflecting layer 562 may be formed on a surface of the extension radiating member 460 facing the light guide plate 40. The member reflecting layer 562 may be integrated into the extension radiating member 460, or provided as a separate component from the extension radiating member 460 to be in contact with the extension radiating member 460. Also, a surface of the extension radiating member 460 may be formed as a reflective surface to function as the member reflecting layer 562.

According to the example embodiments, it is possible to improve color reproducibility of a LCD apparatus of displaying an image using light emitted from a backlight unit.

According to the example embodiments, by installing a heat radiator in a light source package, it is possible to improve heat radiation efficiency of the light source package, while improving color reproducibility.

According to the example embodiments, it is possible to provide an optimal layout between a heat radiating apparatus and quantum dots capable of improving color reproducibility in a display apparatus.

Although a few example embodiments have been shown and described, it would be appreciated by those skilled in the art that changes may be made in these example embodiments without departing from the principles and spirit of the disclosure, the scope of which is defined in the claims and their equivalents.

What is claimed is:

1. A display apparatus comprising:
a display panel;
a light guide plate disposed behind the display panel;
a printed circuit board;
a heat radiator disposed on the printed circuit board and configured to radiate heat; and
a plurality of light source packages disposed on the printed circuit board and configured to supply light to the light guide plate, each light source package of the plurality of light source packages comprising:
a light source configured to generate the light;
a light converter configured to convert properties of the light generated by the light source, and
a package housing in which the light source is installed, the package housing being disposed on the printed circuit board and in contact with the light converter to transfer heat from the light converter to the heat radiator.

2. The display apparatus according to claim 1, wherein the heat radiator is in contact with the package housing of each of the plurality of light source packages.

3. The display apparatus according to claim 1, wherein the heat radiator comprises:
a radiating member disposed on the printed circuit board; and
an expansion member disposed between and in contact with the radiating member and the package housing of each of the plurality of light source packages to expand heat transfer areas between the radiating member and the package housing of each of the plurality of light source packages.

4. The display apparatus according to claim 3, wherein the radiating member comprises a first heat transfer surface facing the package housing and a third heat transfer surface comprising the first heat transfer surface,
the package housing of each of the plurality of light source packages comprises a second heat transfer surface facing the radiating member and a fourth heat transfer surface comprising the second heat transfer surface, and
the expansion member is in contact with the radiating member through the third heat transfer surface, and in contact with the package housing through the fourth heat transfer surface.

5. The display apparatus according to claim 4, wherein the third heat transfer surface and the fourth heat transfer surface are larger than the first heat transfer surface and the second heat transfer surface, respectively.

6. The display apparatus according to claim 3, wherein the radiating member comprises a first heat transfer surface and a third heat transfer surface extending from the first heat transfer surface,
the package housing comprises a second heat transfer surface and a fourth heat transfer surface extending from the fourth heat transfer surface,
the first heat transfer surface of the radiating member is in contact with the fourth heat transfer surface of the package housing, and
the expansion member is in contact with the third heat transfer surface of the radiating member, and in contact with the second heat transfer surface of the package housing.

7. The display apparatus according to claim 3, wherein the expansion member covers at least a part of one surface of the radiating member.

8. The display apparatus according to claim 3, wherein the printed circuit board comprises:
a first printed circuit board disposed on a rear surface of the light guide plate; and
a second printed circuit board extended from the first printed circuit board and facing a side surface of the light guide plate,
wherein the plurality of light source packages are arranged on the second printed circuit board,
the radiating member is disposed on the first printed circuit board, and
the expansion member is disposed adjacent to a bent portion between the first printed circuit board and the second printed circuit board.

9. The display apparatus according to claim 3, wherein the expansion member comprises silicon.

10. The display apparatus according to claim 1, wherein the heat radiator is integrated into the package housing, and extends from the package housing along the mounting surface.

11. The display apparatus according to claim 1, wherein the heat radiator comprises:
a radiating member in contact with a surface of each of the plurality of light source packages; and
an extension radiating member extending from the radiating member, and configured to be in contact with a side surface each of the plurality of light source packages.

12. The display apparatus according to claim 11, wherein the extension radiating member is disposed between space between the plurality of light source packages.

13. The display apparatus according to claim 1, wherein the heat radiator comprises:
a radiating member in contact with first surfaces of the plurality of light source packages; and
an extension radiating member extending from the radiating member, and surrounding other surfaces of the plurality of light source packages, and side surfaces of the plurality of light source packages connecting the first surfaces to the other surfaces.

14. The display apparatus according to claim 13, wherein the extension radiating member comprises a member reflecting layer facing the light guide plate, and configured to reflect light reflected by the light guide plate toward the light guide plate.

15. The display apparatus according to claim 1, wherein the heat radiator is spaced from a light path from the plurality of light source packages toward the light guide plate.

16. The display apparatus according to claim 1, further comprising a reflective member disposed on a rear surface of the light guide plate, and configured to reflect light emitted from the plurality of light source packages toward the display panel,
wherein the heat radiator is disposed between the reflective member and the printed circuit board.

17. A display apparatus comprising:
a display panel;
a light guide plate disposed behind the display panel;
a first printed circuit board;
a second printed circuit board extending from the first printed circuit board; and
a plurality of light source packages arranged on the first printed circuit board, and configured to supply light to the light guide plate, each of the plurality of light source packages comprising:
a package housing having an open portion opening toward the light guide plate;
a light source disposed in the package housing, and configured to generate the light; and
a light converter configured to convert properties of the light generated by the light source, and having a first side facing the light source, and a second side opposite to the first side and facing the light guide plate, wherein a portion of the light converter is in contact with the package housing along an inner surface of the package housing; and
a heat radiator disposed on the second printed circuit board, and configured to receive heat transferred from the package housing of each of the plurality of light source packages and radiate the heat.

18. The display apparatus according to claim 17, wherein the heat radiator comprises:
a radiating member; and
an expansion member disposed between and in contact with the radiating member and the package housing of each of the plurality of light source packages to expand heat transfer areas between the radiating member and the package housing of each of the plurality of light source packages.

19. The display apparatus according to claim 18, wherein the radiating member is disposed on the second printed circuit board, and
the expansion member is disposed adjacent to a bent portion between the first printed circuit board and the second printed circuit board.

20. A display apparatus comprising:
a display panel;
a printed circuit board;
a plurality of light sources mounted on the printed circuit board, and configured to generate light;
a light guide plate configured to receive the light generated by the plurality of light sources and transfer the light to the display panel;
a light converter disposed between the plurality of light sources and the light guide plate, and configured to convert properties of the light generated by the plurality of light sources;
a package housing in which the plurality of light sources are arranged, and the light converter is installed; and
a heat radiator integrated into the package housing, and extending from the package housing along the printed circuit board, the heat radiator being configured to radiate heat transferred from the package housing.

* * * * *